UNITED STATES PATENT OFFICE.

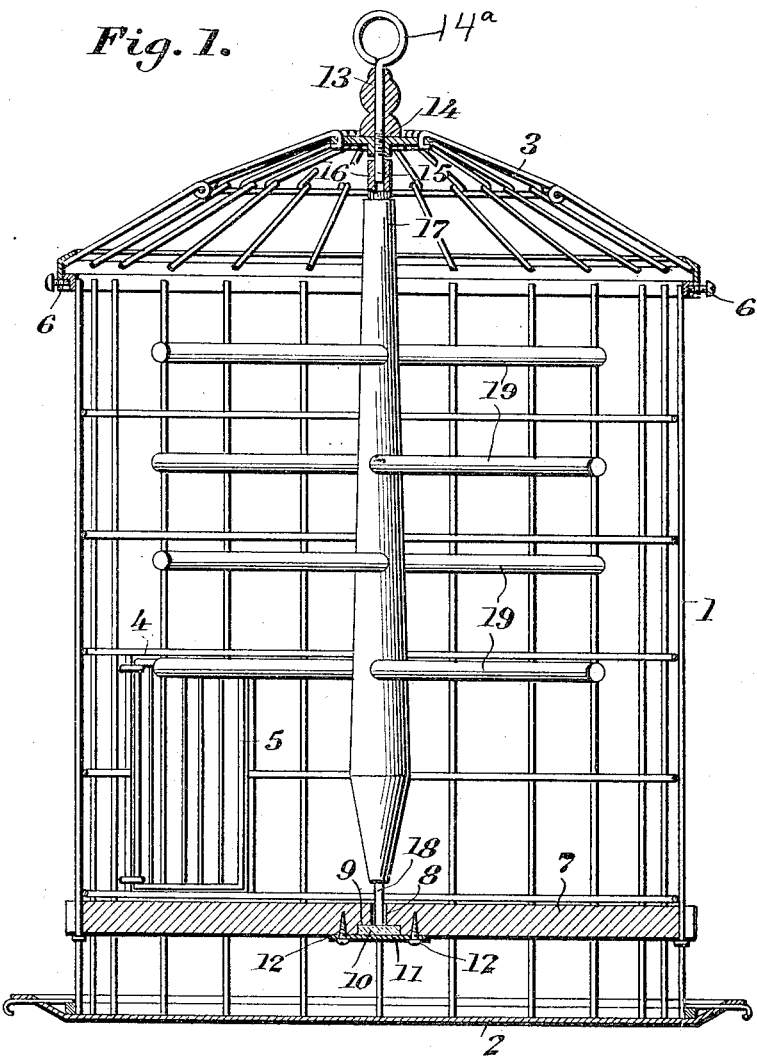

FREDRICK C. WARNECKE, OF MADISON, WISCONSIN.

BIRD AND ANIMAL CAGE.

1,123,044.	Specification of Letters Patent.	Patented Dec. 29, 1914.

Application filed January 28, 1914. Serial No. 815,086.

*To all whom it may concern:*

Be it known that I, FREDRICK C. WARNECKE, a citizen of the United States, residing at Madison, in the county of Dane and State of Wisconsin, have invented new and useful Improvements in Bird and Animal Cages, of which the following is a specification.

This invention relates to animal cages, and particularly to a revolving perch therefor and the construction of the perch so that it may be freely revolved through force applied thereto when the animal jumps thereon.

Another object of the invention is the provision of means for expediting the operation of removing the perch from the cage or applying the same thereto, as the occasion may demand.

A further object of the invention is the provision of means for minimizing the friction between the perch and the supporting parts of the cage.

With these and other objects in view, the invention consists of certain novel features of construction, combination and arrangement of parts, as will be hereinafter described and claimed.

In the accompanying drawings:—Figure 1 is a vertical section through the cage; and Fig. 2 is a bottom plan view of the supporting member.

While the perch is primarily intended for use in cages for domesticated animals, such as canary birds or the like, I wish it to be understood that it may be used in connection with circus wagons having cages constructed therein and that it is extremely desirable for use in monkey cages, so that the perch may be freely revolved and at frequent intervals by the animals jumping thereon.

The cage proper may be of any suitable well known construction and in the present instance it is shown to consist of a body 1 of foraminated material, a bottom or tray 2, and a top 3.

The body 1 has an opening 4 therein which may be closed in the usual manner by a suitable door 5.

The top 3 is preferably separable from the body 1 and devices 6 are employed herein for the purpose of normally holding the top against accidental separation from the body.

As to this construction, I do not desire to be limited for I have simply employed a means whereby the perch to be subsequently referred to may be readily removed when desired. The body 1 of the cage has fitted therein at diametrically opposite points a horizontal support 7 having a vertical passage 8 at its center and an underlying recess 9.

In the recess 9 is mounted a glass bearing plate 10, which is adapted to close the lower end of the passage 8. This plate is secured in place by a retaining plate 11, which may be removably fitted to the support 7 by means of screws or the like 12.

In line with the passage 8 the top 3 is provided with a knob 13 having a screw 14 finding a bearing in the top and provided with a relatively smooth lower portion 15 which is adapted to be extended into a tubular bearing sleeve 16, at the upper end of a standard 17. The mentioned screw 14 is extended entirely through the knob 13, and above the knob the screw is bent into a knob 14ª which may be used as an attaching member to support the cage from a suitable hook (not shown).

At the extreme lower end the standard 17 has secured thereto a pin 18 which finds a bearing on one surface of the plate 10, as clearly shown in Fig. 1.

The standard 17 is provided with a number of radial perches 19 that are arranged so that when an animal jumps upon them the standard 17 will be revolved.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

I claim:—

1. A cage, a standard arranged vertically therein and provided at its lower end with a pin, a perch carried by the standard, a supporting bar extending across the cage and having a vertical opening in which said pin is arranged, a bearing plate at the lower end of said opening and on which said pin bears and a retaining plate secured on the under side of the bar and holding the bearing plate in place.

2. A cage, a standard therein having a tubular sleeve at its upper end, a bearing for the lower end of the standard, a perch carried by the standard, and a hook for hanging the cage, arranged at and extending through the tube of the cage and having its lower end engaged in said bearing sleeve of the standard.

In testimony whereof I affix my signature in presence of two witnesses.

FREDRICK C. WARNECKE.

Witnesses:
FRANK E. PARKINSON,
J. W. CORNELIUS.

Copies of this patent may be obtained for five cents each, by addressing the "Commissioner of Patents, Washington, D. C."